United States Patent
Hu

(10) Patent No.: US 7,640,628 B2
(45) Date of Patent: Jan. 5, 2010

(54) HINGE ASSEMBLY FOR FLAT DISPLAY MONITOR

(75) Inventor: An-Kui Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 181 days.

(21) Appl. No.: 11/499,318

(22) Filed: Aug. 4, 2006

(65) Prior Publication Data

US 2007/0050942 A1 Mar. 8, 2007

(30) Foreign Application Priority Data

Aug. 26, 2005 (CN) .................... 2005 1 0036894

(51) Int. Cl.
E05C 17/64 (2006.01)
(52) U.S. Cl. ........................................... 16/340
(58) Field of Classification Search ............ 16/412; 248/16, 158, 159
See application file for complete search history.

(56) References Cited

U.S. PATENT DOCUMENTS

| | | | | | |
|---|---|---|---|---|---|
| 5,109,572 | A | * | 5/1992 | Park | 16/334 |
| 5,473,794 | A | * | 12/1995 | Kobayashi | 16/337 |
| 5,794,308 | A | * | 8/1998 | Rentsch et al. | 16/225 |
| 6,018,847 | A | * | 2/2000 | Lu | 16/337 |
| 6,154,925 | A | * | 12/2000 | Miura | 16/338 |
| 6,347,433 | B1 | * | 2/2002 | Novin et al. | 16/367 |
| 6,453,509 | B1 | * | 9/2002 | Shin | 16/340 |
| D471,194 | S | * | 3/2003 | Huang | D14/375 |
| 6,539,582 | B1 | * | 4/2003 | Chae | 16/340 |
| 6,568,034 | B2 | * | 5/2003 | Cho | 16/337 |
| 6,581,893 | B1 | * | 6/2003 | Lu | 248/291.1 |
| 6,609,272 | B1 | * | 8/2003 | Lee | 16/307 |
| 6,666,422 | B1 | * | 12/2003 | Lu et al. | 248/291.1 |
| 6,671,928 | B2 | * | 1/2004 | Huang | 16/340 |
| 6,676,098 | B2 | * | 1/2004 | Lin | 248/371 |
| 6,883,680 | B2 | * | 4/2005 | Hirose | 220/830 |
| 6,899,311 | B1 | * | 5/2005 | Ternus | 248/454 |
| D539,281 | S | * | 3/2007 | Kim et al. | D14/375 |
| 2002/0057237 | A1 | * | 5/2002 | Lin et al. | 345/87 |
| 2002/0083554 | A1 | * | 7/2002 | Lu | 16/340 |

(Continued)

FOREIGN PATENT DOCUMENTS

TW 534183 5/2003

*Primary Examiner*—Victor Batson
*Assistant Examiner*—Matthew Sullivan
(74) *Attorney, Agent, or Firm*—Clifford O. Chi

(57) ABSTRACT

A hinge assembly (300) for use in a flat display monitor includes a base seat (10), a fixing seat (20), a pivotal shaft (30), a resilient element (80) and a plurality of washers. The base seat includes a pivot flange (14) having a retaining hole (12) formed therein. The pivot flange defines a protrusion (18) therein, and the protrusion extending into the retaining hole. The fixing seat includes an extending portion (26) defining an engaging hole. The resilient element resists between the base seat and the fixing seat. The pivotal shaft has at least one flat surface, and the pivotal shaft is positioned within the retaining hole of the pivot flange. One of the at least one flat surface pivotably engages with the protrusion. The pivotal shaft extends beyond the retaining hole of the pivot flange, and the plurality of washers is fastened together to the pivotal shaft.

13 Claims, 5 Drawing Sheets

U.S. PATENT DOCUMENTS

2002/0112318 A1* 8/2002 Shin .......................... 16/319
2003/0140456 A1* 7/2003 Hsieh et al. .................. 16/340
2005/0125952 A1 6/2005 Lee et al.

* cited by examiner

HINGE ASSEMBLY FOR FLAT DISPLAY MONITOR

BACKGROUND OF THE INVENTION

1. Field of the Invention

The present invention generally relates to a hinge assembly and, particularly, to a hinge assembly for a flat display monitor.

2. Discussion of the Related Art

With the widespread use and the variety of computers available, display devices, configured for such a variety of computers also come in a wide range of sizes, shapes, and weight. In general, a typical cathode-ray tube (CRT) monitor includes a display panel for displaying an image, a vacuum tube coupled to the rear of the display panel, and an electron gun coupled to the rear of the vacuum tube. This configuration is a huge factor in limiting the total volume and final weight of the CRT monitor. In addition to the problem mentioned above, the CRT monitor carries a huge problem in that a user is easily fatigued when looking at the CRT monitor over long hours due to its low image quality. It is this problem alone that many people have recently switched into using a flat screen display monitor, e.g., Liquid Crystal Display (LCD) monitor, from the conventional CRT monitors. Such flat display monitors generally offer the advantages of a greatly reduced size and weight properties including the ability to produce a high image quality. Furthermore, flat screen display monitors may help to overcome space limitations through folding over (such as with a laptop computer) or rotating (such as with a desktop monitor) so as to facilitate adjustment of the position thereof relative to the user.

The rotating or folding-over functions of the flat display monitor are realized with a hinge assembly. For example, a hinge assembly is disclosed in U.S. Pat. Pub. No. 2002/0083554. The hinge assemble includes an L-shaped fixed seat, a pivotal axle, and multiple oiled washers. The fixed seat has a retaining hole defined thereof. The pivotal axle is pivotally connected with the fixed seat. The pivotal axle has a retaining shoulder formed at a middle portion thereof, a connecting end portion integrally formed at a first end of the retaining shoulder, and a fixing end portion integrally formed at a second end of the retaining shoulder. The connecting end portion of the pivotal axle is extended through a retaining hole of the fixed seat along with multiple oiled washers, and then fastened by a fastening piece. The hinge assembly may realize a maximum inclination angle of the flat display monitor so that the LCD shall not over fold, over shifting a center of gravity, causing the LCD to fall over. However, in use, it is needed to use great efforts to rotate the hinge assembly, since a greater force is exerted thereon. Therefore, the flat display monitor is highly damaged prone. As a result, it is inconvenient for a user to operate the hinge assembly.

Therefore, a new hinge assembly is desired in order to overcome the above-described shortcomings.

SUMMARY

In one embodiment thereof, a hinge assembly for use in a flat display monitor includes a base seat, a fixing seat, a resilient element, a pivotal shaft, and a plurality of washers. The base seat includes a pivot flange having a retaining hole formed therein. The pivot flange defines a protrusion therein, and the protrusion extending into the retaining hole. The fixing seat includes an extending portion defining an engaging hole. The resilient element resists between the base seat and the fixing seat. The pivotal shaft has at least one flat surface, and the pivotal shaft is positioned within the retaining hole of the pivot flange. One of the at least one flat surface pivotably engages with the protrusion. The pivotal shaft extends beyond the retaining hole of the pivot flange and non-rotatably engages in the engaging hole of the fixing seat. The plurality of washers is fastened together by the pivotal shaft.

Other advantages and novel features will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily drawn to scale, the emphasis instead being placed upon clearly illustrating the principles of the hinge assembly. Moreover, in the drawings, like reference numerals designate corresponding parts throughout the several views.

DETAILED DESCRIPTION OF THE EMBODIMENTS

Figure 1:
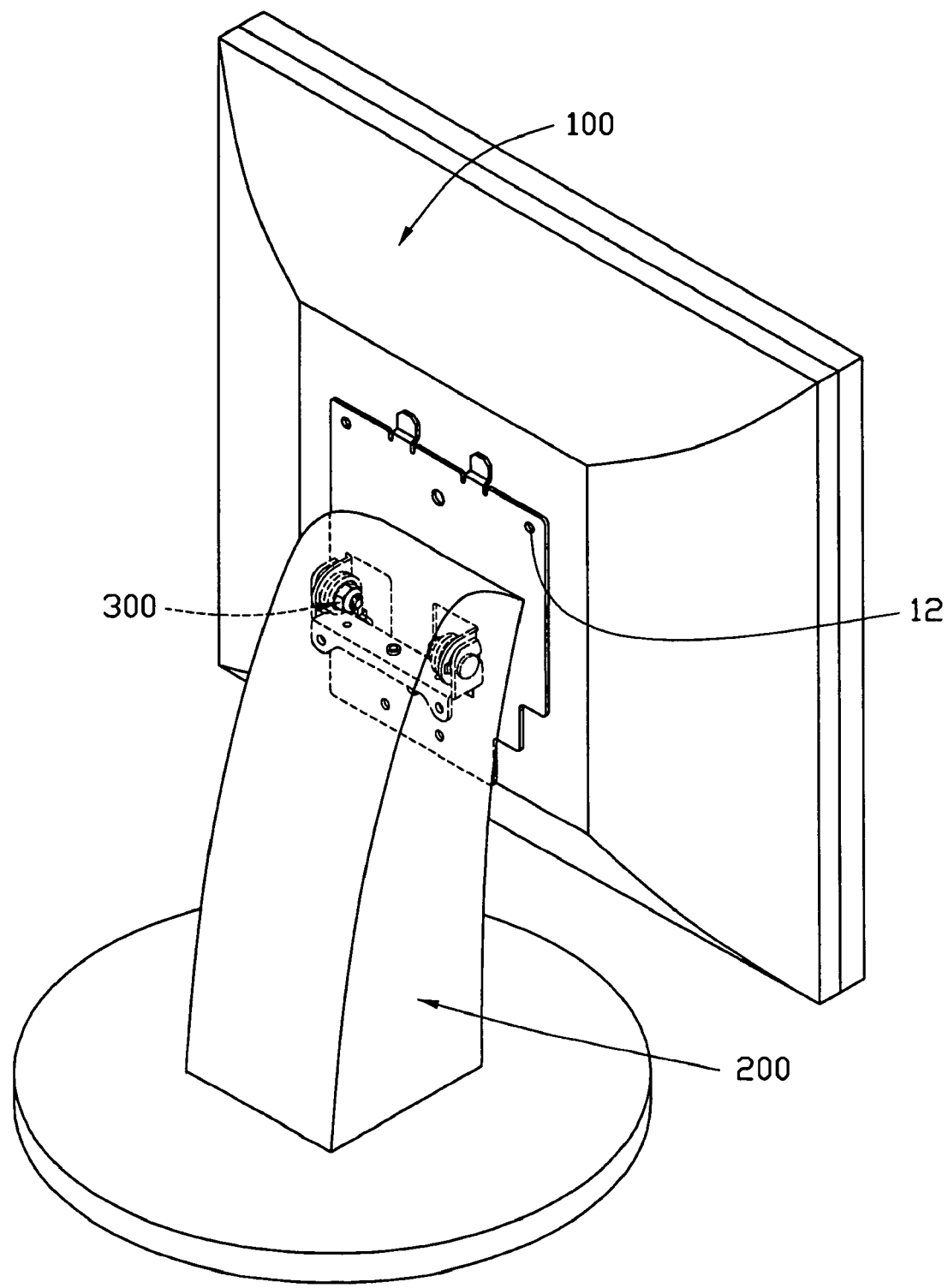
FIG. 1 is an isometric view of an embodiment of a hinge assembly, as used in a flat display screen.

Referring to drawings in detail, FIG. 1 shows a flat display monitor employing a hinge assembly 300 in accordance with a first embodiment of the present invention. The flat display monitor is taken here as an exemplary application, for the purposes of describing details of the hinge assembly 300. It is to be understood, however, that the hinge assembly 300 could be advantageously used in other environments (e.g. cabinet doors). As such, although proving particularly advantages when used in flat display monitors, the hinge assembly 300 should not be considered limited in scope solely to an intended use environment of flats display monitors. A hinge assembly 300 is illustrated in the flat display monitor as shown in FIG. 1. The flat display monitor includes a display unit 100 and a support body 200. The hinge assembly 300 connects the display unit 100 to the support body 200 such that the display unit 100 can be pivoted relative to the support body 200.

Figure 2:
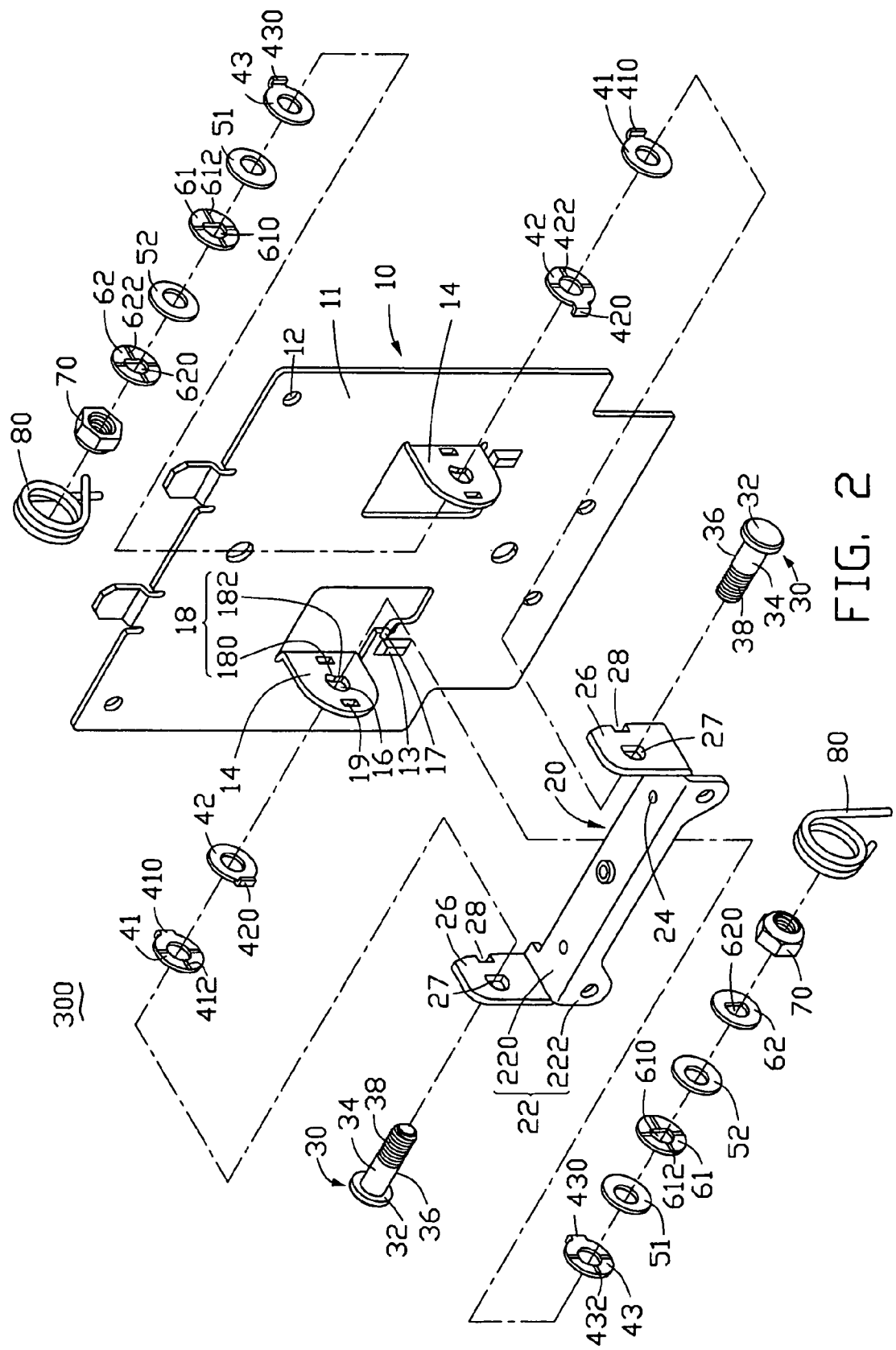
FIG. 2 is an exploded, isometric view of the hinge assembly in shown in FIG. 1.

Referring to FIG. 2, the hinge assembly 300 includes a base seat 10, a fixing seat 20, two pivot sets consisting a pivotal shaft 30, a triplet of first washers 41, 42, and 43, a pair of resilient washers 51 and 52, a pair of second washers 61 and 62, a screw nut 70, and a resilient element 80. The hinge assembly 300 uses the base seat 10 and the fixing seat 20 to connect the display unit 100 and the support body 200 respectively. The pivotal shaft 30 passes through the fixing seat 20, the base seat 10 and multiple washers. The pivot shaft 30 is then fastened in its assembled position with the screw nut 70.

The base seat 10 is substantially a board, which includes a main board 11. The main board 11 has several fixing holes 12 defined in the brim thereof. The base seat 10 may be fixed on the display unit 100 by means of the fixing holes 12. The main board 11 disposes two symmetrical pivot flanges 14 at a middle portion thereof. Each pivot flange 14 is perpendicular to the main board 11. The pivot flanges 14 are formed through cutting and bending. Each pivot flange 14 is substantially half-circular in shape, and has a retaining hole 16 defined therein. A protrusion 18 is formed extending inwards on an arc of the retaining hole 16. The protrusion 18 has two symmetrical edges 180 and 182 and is substantially <-shaped (i.e., a rotated V shape). A protrusion angle associated with the protrusion 18 establishes the rotational angle limits for the two pivot sets of hinge assembly 300 and, thus, for the display unit 100. Each pivot flange 14 has a rectangular locking hole 19 defined adjacent to each side of the retaining hole 16. The base seat 10 disposes resisting portions 17, one at a side of each pivot flange 14. The resisting portions 17 are disposed between the two pivot flanges 14 and are inclined to some angles relative to the main board 11. The main board 11 has a projecting block 13 disposed between the pivot flange 14 and the resisting portion 17 thereof.

The fixing seat 20 includes a fixing board 22 and two pivot boards 26. The fixing board 22 is made up of a horizontal board 220 and a perpendicular board 222 connected with each other. The horizontal board 220 has two receiving holes 24 defined therein. The fixing seat 20 is mounted on the support body 200 by means of the receiving holes 24. Each pivot board 26 extends from opposite ends of the fixing board 20 adjacent to the perpendicular board 222. The pivot boards 26 extend in a direction opposite to that of the perpendicular board 222. Each pivot board 26 has a D-shaped engaging hole 27 defined thereof. Each pivot board 26 has a notch 28 defined thereof opposite to the perpendicular board 222.

Figure 3:
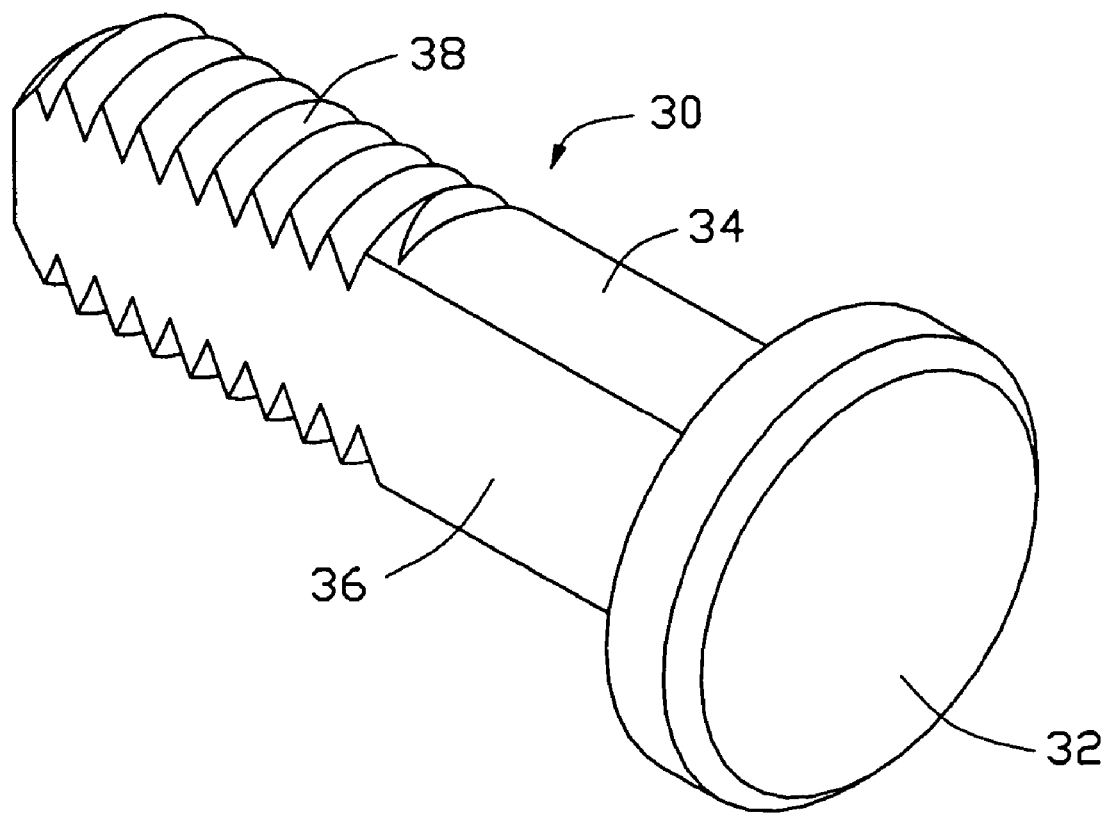
FIG. 3 is an enlarged, isometric view of the shaft shown in FIG. 2.

Referring also to FIG. 3, the pivotal shaft 30 is substantially cylindrical in shape. The pivotal shaft 30 includes a shaft portion 34 and a fixing portion 32 integrally formed at a distal end of the shaft portion 34. The fixing portion 32 is substantially a disklike shape. The shaft portion 34 defines a thread 38 on a distal end portion thereof opposite to the fixing portion 32. The shaft portion 34 is flattened along a section of the curved surface area forming a flat surface 36 making the thread 38 thereof non-continuous. The shaft portion 34 may pass through the engaging hole 27 of the fixing seat 20 and the retaining hole 16 of the base seat 10.

The first washers 41, 42, and 43 are each ringlike. Each of the first washers 41, 42, and 43 has a latching end 410, 420, and 430 disposed at one side of the brink respectively thereof. The latching end 410 of the first washer 410 is configured for inserting into the notch 28 of the fixing seat 20, and the latching end 420 and 430 may be received in the locking holes 19 of the base seat 10, thereby limiting the rotation of the first washers 41, 42, and 43. Each of the first washers has a plurality of oil grooves 412, 422, and 432 on the face opposite to the latching end. The oil grooves can be lubricated so that the operation of the hinge assembly 300 is smooth and the work life of the hinge assembly is prolonged.

The resilient washers 51 and 52 are in essence Belleville washers. The two resilient washers 51 and 52 are passed through the pivotal shaft 30. The resilient washers 51 and 52 may provides an amount of friction that helps the display unit 100 retain the desired positioning relative to the support body 200.

The second washers 61 and 62 are ringlike shaped. Each of the second washers 61 and 62 has a latching hole 610 and 620 respectively defined therein. The latching holes 610 and 620 are D-shaped. A side of the second washers 61 and 62 has oil grooves 612 and 622 respectively defined thereon for saving lubricant oils.

The resilient element 80 is a helical spring. One end of the resilient element 80 is locked onto the base seat 10 between the resisting portion 17 and the projecting block 13. Another end of the resilient element 80 resists the horizontal board 220 of the fixing seat 20. When the hinge assembly 300 is assembled, the resilient element 80 exerts a predetermined torsion force. A diameter of the resilient element 80 is larger than that of the resilient washers 51 and 52 and the second washers 61 and 62 so as to avoid interference each other. The screw nut 70 is fastened with the thread 38 of the shaft portion 34 of the pivotal shaft 30. All of the washers, as a group, maintain the desired spacing between the various portions of the pivot of the hinge assembly 300. Furthermore, the washers together help provide an amount of friction that allows movement of the display unit 100 relative to the support body 200 upon application of a moderate force but that, otherwise, helps retain the desired positioning between the support body 200 and the display unit 100. Part of the needed friction can, be expected to be gained through the operation of the other elements of the hinge assembly 300 as well.

Figure 4:
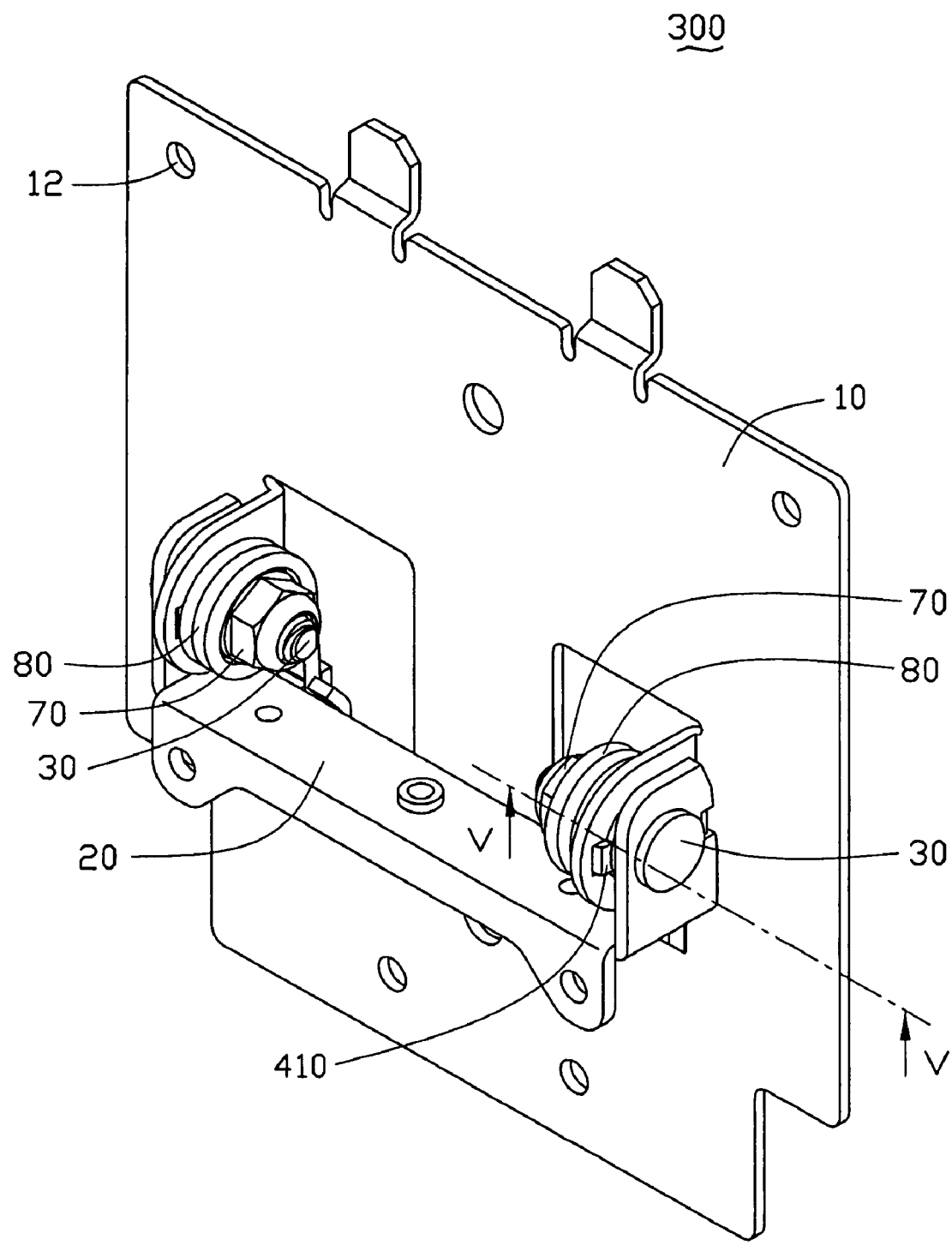
FIG. 4 is an enlarged, assembled view, showing the hinge assembly of FIG. 2.
Figure 5:
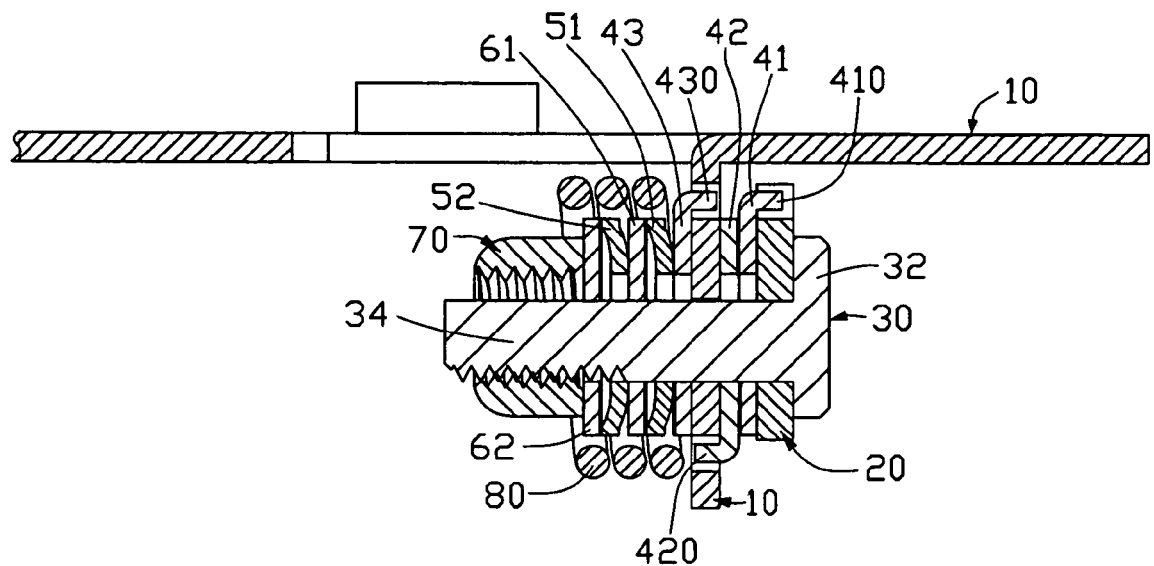
FIG. 5 is a cut-away view of FIG. 4 along V-V line.

During assembly, referring now to FIGS. 4 and 5, first, the latching end 410 of the first washer 40 is inserted into the notch 28 of the pivot board 26. Then, the two first washers 42 and 43 are disposed separately on the two sides of the pivot flange 14 of the base seat 10, with the latching ends 420 and 430 engaging in a corresponding locking hole 19 of the base seat 10. After that, the resilient element 80 is placed around the shaft portion 34 of the pivotal shaft 30. The resilient element 80 has a predetermined torque force. One end of the resilient element 80 is mounted onto the base seat 10 between the resisting portion 17 and the projecting block 13, the other end of the resilient element resist the horizontal board 220 of the fixing seat 20. Then, the shaft portion 34 of the pivotal shaft 30 passes through the engaging hole 27 of the fixing seat 20, the first washers 41 and 42, the retaining hole 16 of the base seat 10, the first washer 43, in that order. After that, the shaft portion 34 is passed through the resilient washer 51, the second washer 61, the resilient washer 52, and the second washer 62. The resilient washers 51 and 52 are disposed opposite to each other. Finally, the screw nut 70 is fixed via the screw thread 38 of the shaft portion 34.

Figure 6:
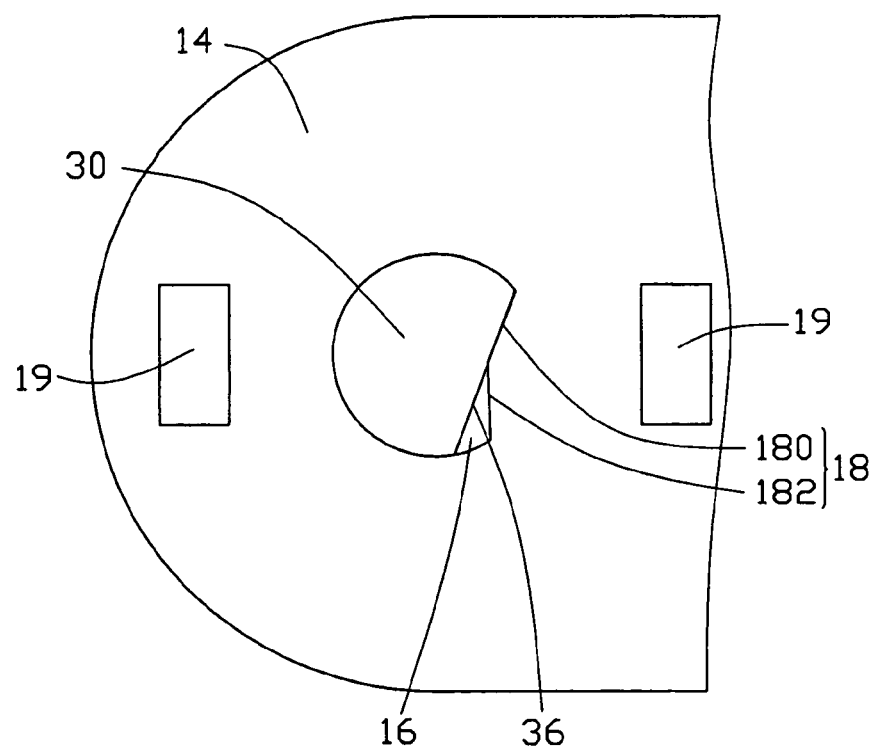
FIG. 6 is a simplified, side view, showing the shaft of the hinge assembly rotating in the retaining hole.

In use, a pushing force is exerted on the display unit 100, and, in turn, the display unit 100 causes the base seat 10 to likewise move. The resilient element 80 also rotates with the base seat 10. Accordingly, the resilient element 80 generates a recovering force so as to balance out the pushing force. The protrusion 18 associated with the pivot flange 14 will rotate relative to an adjacent flat surface 36 of the pivotal shaft 30. Because the pivotal shaft 30 is operatively fixed to the support body 200, the display unit 100 rotates relative to the support body 200. Referring to FIG. 6, the adjusting degree range is limited by the configuration of the protrusions 18. The first washers 41 and 42 are disposed between the base seat 10 and the fixing seat 20 and the first washer 43 is disposed at one side of the base seat 10. This configuration may decrease the abrasion between the base seat 10 and the fixing seat 20 so as to prolong the use life.

In alternative embodiments, the pivotal shaft 30 is fastened, e.g., by means of a rivet or by a latch pin. In a similar fashion, the screw nut 70 and threaded portion 38 of the shaft portion 34 could, for example, be replaced with a latch pin and receiving hole combination. In alternative embodiments, the hinge assembly 300 is divided into two hinge assemblies. Each hinge assembly includes an independent base seat 10, an independent fixing seat 20 and one pivot set. Two identical hinge assemblies are separately connected with the display unit 100 and the support body 200.

As described above, the <-shaped (i.e., a wide-angle V shape) protrusion 18 needs to be disposed two sides. One such protrusion 18 is readily manufactured. A precision of rotation range is easily controlled.

In the above-mentioned embodiments, the pivotal shaft 30 may be fixed with the fixing seat by other ways, for example, be replaced with riveting or welding. In an alternative embodiment, the pivotal shaft may be fixed with the base, and the engaging hole may be defined in the base. Furthermore, the retaining hole may be defined in the fixing seat. In an alternative embodiment, the pivotal shaft may be formed with a <-shaped protrusion, and the retaining hole may be defined with at least one flat surface. Moreover, all of the washers disclosed above may be replaced with other structures that can perform such limiting function.

As described above, the preferred embodiments provides a hinge assembly 300 for devices such as a flat display screen, which is convenient for a user to operate and which is durable. It is, however, to be understood that the hinge assembly 300 could potentially be useful in other applications (e.g., a free-standing, adjustable mirror) in which it may be desirable to allow selective pivoting over a limited angular range.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A hinge assembly, comprising:
   a base seat, the base seat including a pivot flange, the pivot flange having a retaining hole formed therein, the pivot flange defining a protrusion therein, the protrusion extending into the retaining hole;
   a fixing seat including an extending portion, the extending portion defining an engaging hole;
   a resilient element residing between the base seat and the fixing seat;
   a pivotal shaft, the pivotal shaft having at least one flat surface, the pivotal shaft being positioned within the retaining hole of the pivot flange, one of the at least one flat surface pivotably engaging with the protrusion; and
   a plurality of washers;
   wherein the pivotal shaft extends beyond the retaining hole of the pivot flange and non-rotatably engages in the engaging hole of the fixing seat, the plurality of washers being fastened together to the pivotal shaft, the washers includes a triplet of first washers, each of the first washers has a latching end, the pivot flange has a locking hole defined at two sides of the retaining hole, the fixing seat has a notch adjacent to one side of the engaging hole, each of two of the latching ends engages in a corresponding locking hole, another latching end engages in the notch.

2. The hinge assembly as claimed in claim 1, wherein the protrusion is substantially V-shaped and has two symmetrical edges.

3. The hinge assembly as claimed in claim 1, wherein the pivotal portion has a single flat surface, the flat surface pivotably engaging with the protrusion.

4. The hinge assembly as claimed in claim 1, wherein the pivotal shaft includes a fixing portion and a shaft portion, the fixing portion and the shaft portion being integrally formed.

5. The hinge assembly as claimed in claim 4, wherein the shaft portion defines a thread at one end thereof opposite to the fixing portion.

6. The hinge assembly as claimed in 5, wherein the hinge assembly further comprises a screw nut, the screw nut engaging with the thread of the shaft portion.

7. The hinge assembly as claimed in claim 1, wherein the base seat disposes a resisting portion at one side of the pivot flange, a projecting block is disposed between the resisting portion and the pivot flange, and one end of the resilient element is mounted between the resisting portion and the projecting block.

8. The hinge assembly as claimed in claim 7, wherein the fixing seat further includes a fixing board, the fixing board is perpendicular to the pivot board.

9. The hinge assembly as claimed in claim 8, wherein the fixing board includes a horizontal board and a perpendicular board extending from one side of the horizontal board, another end of the resilient element is mounted on the horizontal board.

10. The hinge assembly as claimed in claim 1, wherein the washers further includes two resilient washers and two second washers, the two resilient washers and two second washers are placed around at the shaft alternatively.

11. A hinge assembly configured for facilitating limited pivotal movement of a first unit relative to a second unit, the hinge assembly comprising:
   a base seat being configured for attachment with one of the first unit and the second unit;
   a fixing seat being configured for being operatively connected to the other of the first unit and the second unit;
   a resilient element resisting between the base seat and the fixing seat; and
   a pivotal shaft;
   wherein the base seat includes a pivot flange, the pivot flange has a retaining hole formed therein, the pivot flange defines a protrusion therein, and the protrusion extends into the retaining hole, the fixing seat includes an extending portion, the extending portion defines an engaging hole, the pivotal shaft has at least one flat surface, the pivotal shaft extends beyond the retaining hole of the pivot flange and non-rotatably engages in the engaging hole of the fixing seat, one of the at least one flat surface of the pivotal shaft pivotably engages with the protrusion, the base seat disposes a resisting portion at one side of the pivot flange, a projecting block is disposed between the resisting portion and the pivot flange, and one end of the resilient element is mounted between the resisting portion and the projecting block.

12. The hinge assembly as claimed in claim 11, further comprising a plurality of washers, the plurality of washers is fastened together to the pivotal shaft.

13. The hinge assembly as claimed in claim 11, wherein the fixing seat further includes a fixing board, the fixing board is perpendicular to the pivot board, the fixing board includes a horizontal board and a perpendicular board extending from one side of the horizontal board, another end of the resilient element is mounted on the horizontal board.

* * * * *